July 5, 1966 L. CAMPANARO ETAL 3,258,883
RIGIDIZED EVACUATED STRUCTURE
Filed Sept. 25, 1962 3 Sheets-Sheet 1
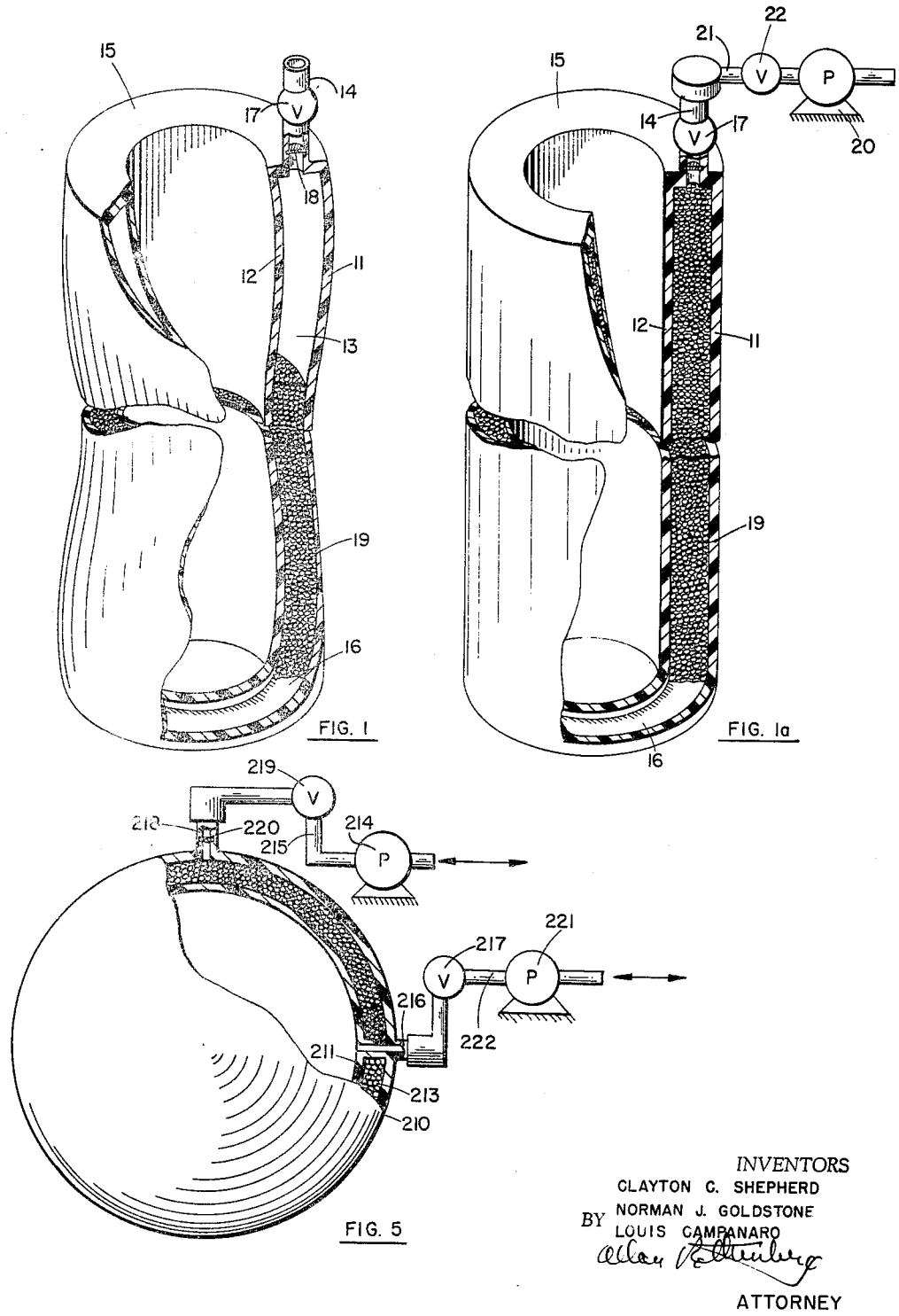
INVENTORS
CLAYTON C. SHEPHERD
NORMAN J. GOLDSTONE
LOUIS CAMPANARO
BY
ATTORNEY July 5, 1966 L. CAMPANARO ETAL 3,258,883
RIGIDIZED EVACUATED STRUCTURE
Filed Sept. 25, 1962 3 Sheets-Sheet 2

INVENTORS
CLAYTON C. SHEPHERD
NORMAN J. GOLDSTONE
BY LOUIS CAMPANARO

ATTORNEY

July 5, 1966
L. CAMPANARO ETAL
3,258,883
RIGIDIZED EVACUATED STRUCTURE
Filed Sept. 25, 1962
3 Sheets-Sheet 3
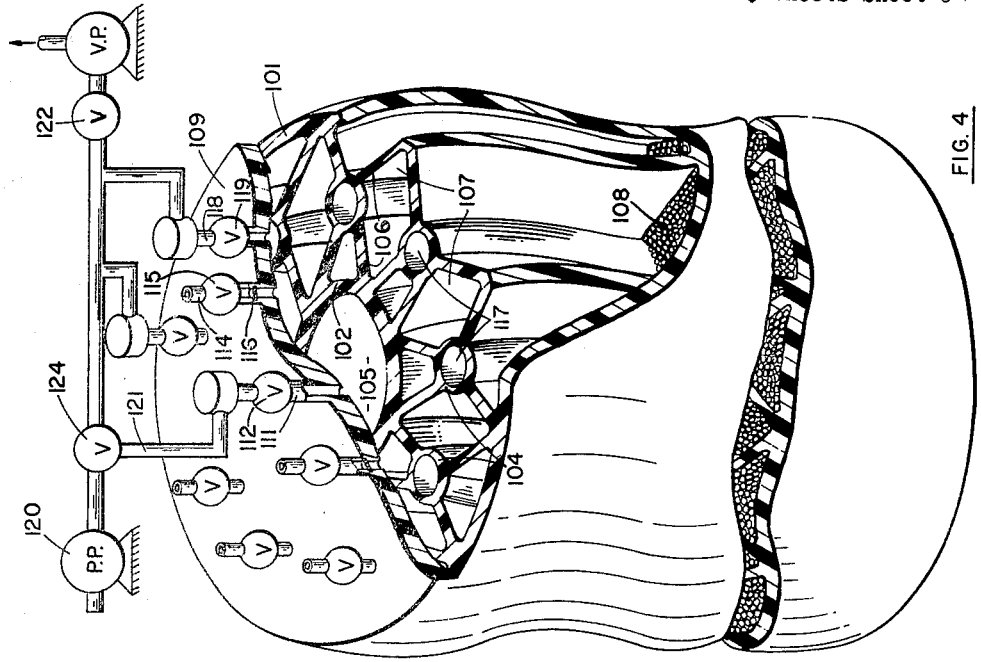
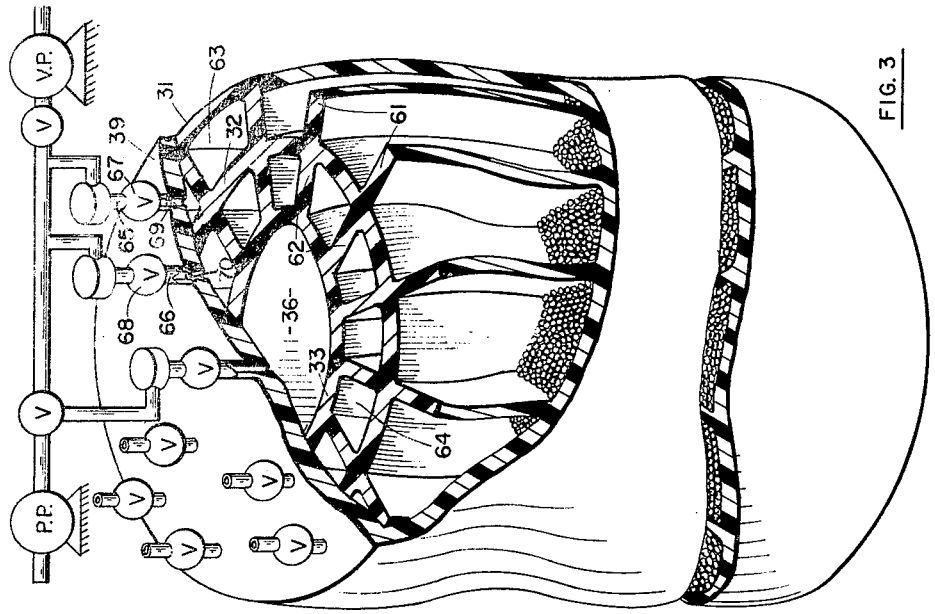
INVENTORS
CLAYTON C. SHEPHERD
NORMAN J. GOLDSTONE
LOUIS CAMPANARO
BY
ATTORNEY

United States Patent Office 3,258,883
Patented July 5, 1966

3,258,883
RIGIDIZED EVACUATED STRUCTURE
Louis Campanaro, Fullerton, Norman J. Goldstone, Hollywood, and Clayton C. Shepherd, Bellflower, Calif., assignors to North American Aviation, Inc.
Filed Sept. 25, 1962, Ser. No. 226,070
3 Claims. (Cl. 52—2)

This invention relates to structural apparatus and more particularly concerns rigidized structures that may be alternatively folded for compact storage or deployed to support substantial loads and provide insulation from heat, impact, and sound.

With the advancement of probes into space the need has become acute for load bearing structural members of considerable size and of various shapes suitable for use in the space environment that may be so configured during storage and transport aboard a spacecraft as to have minimum length to width ratio.

Articles possessing such characteristics are also desirable for use on the surface of the earth as structural members or for application where an article must be rigid for use and yet is of greater utility if certain of its dimensions can be reduced for storage and transportation. Present devices to meet these requirements principally comprise telescoping, segmented, or inflatable structural members. Neither of the first two of these appear to be desirable for use in space or for many earth uses because of the inherent excessive weight and involved assembly procedure. An inflatable structure wherein the load is supported by the contained fluid is not desirable because of the high internal pressures required.

The present invention avoids such disadvantages by providing members constructed of thin, flexible, semipermeable or impermeable walls, relatively closely spaced; containing a multitude of particles and having a means to control the ratio of the fluid pressures internal and external to said walls. Such structures are not rigid because the particles are not compacted. But rigidity is easily achieved by compacting the particles and is enhanced if the fluid between the walls is removed. If a proper three dimensional configuration is selected the rigidized member can bear considerable axial, torsional, or radial loads and yet be light in weight. Dimensional characteristics are also paramount in obtaining structures that may be folded when not rigid to achieve a minimum length to width ratio.

Accordingly, it is a broad object of this invention to provide an article of manufacture that may be alternatively rigidized and relaxed.

It is a further object of this invention to provide a lightweight rigidized structural member capable of supporting substantial axial, torsional, and radial tension, compression, and shear loads; that may be easily relaxed and folded for compact storage.

It is another object of this invention to provide a rigidifiable support member that may be compactly stored and when deployed into its rigid condition will provide effective insulation from heat, impact, and sound.

It is a still further object of this invention to provide a rigidifiable structural member that will suffer a minimum loss of load carrying capacity if a rupture occurs in one of the walls.

These and other objects of this invention will become apparent from the detailed description given below in conjunction with the drawings in which:

FIG. 1 shows a rigidifiable double walled support member in a relaxed condition;

FIG. 1a is a view of the support member of FIG. 1 in a rigid condition;

FIG. 3 is a view of a member similar to that shown in FIG. 2 but with compartmentalized spaces;

FIG. 4 is a view of a double tubular walled member containing smaller tubes within the space between the larger tubes; and FIG. 5 shows a double walled spherical structure in a rigid condition.

Figure 2A:
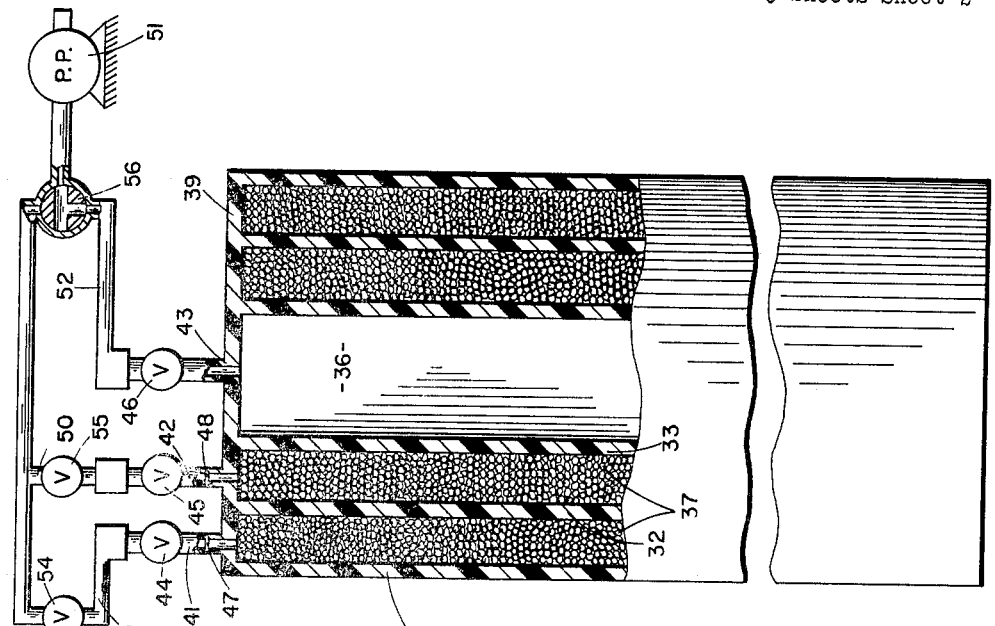
FIG. 2a depicts the member of FIG. 2 in a rigid condition.

Throughout the discussion of this invention embodiments in the form of structural columns are described and referred to as supporting axial loads but it should be understood that radial and torsional loads may be carried also and that this invention is not limited to structural members that act solely to support loads.

FIGS. 1 and 1a show one embodiment of this invention. In FIG. 1 an outer tube 11 and an inner tube 12 are separated by a space 13 encircling the tube 12 and enclosed at the top and bottom by bulkheads 15 and 16 which extend from the outermost peripheral edge of the tube 11 to the innermost peripheral edge of the tube 12. The distance between the tubes 11 and 12 is relatively small compared to the tube diameters. Bulkheads 15 and 16 and the tubes 11 and 12 may be constructed of a suitable thin, flexible, impermeable material such as polyvinylchloride or a fabric impregnated with rubber or siliconized. Communication between the space 13 and the outer environment is accomplished through a nozzle 14 under control of a valve 17. The space 13 contains particles 19 which are described in detail below. A screen 18 is positioned within the nozzle 14 to prevent the particles 19 from escaping. The space 13 is not completely filled with the particles 19 and contains a fluid such as air. As shown in FIG. 1 the pressure within the space 13 is the same as that of the outer environment. The relatively free flowing particles 19 are located in the bottom portion of the space 13 and in that region are sufficient in number to force the flexible inner tube 12 into a somewhat collapsed condition and tend to force the outer flexible tube 11 in an outward direction. The double tube structural member of FIG. 1, because the particles 19 are not in a compact state, lacks rigidity and may be folded. The fluid within the space 13 acts as a lubricant, reducing the coefficient of friction between the individual particles 19. The fluid also acts to inhibit compacting of the particles.

FIG. 1a shows the double tubular walled structure of FIG. 1 in a rigidized condition. The nozzle 14 has been connected to a vacuum pump 20 by suitable connecting means such as a hose 21 and a valve 22. The outer environment is at one atmosphere of pressure. The interior of the tube 12 is exposed to the outer environment. The valves 17 and 22 have been opened and the air in the space 13 has been evacuated by operation of the pump 20. Such evacuation subjects the space 13 to a lower pressure than the outer environment thereby causing the tubular walls 11 and 12 to converge and force the particles 19 to be distributed throughout the entire, now reduced in volume, space 13. The number of particles 19 within the space 13 and the relative diameters of the tubes 11 and 12 are such that the pressure of one atmosphere acting on the exterior of tube 11 and on the interior of tube 12 is sufficient to tightly compact the particles 19 since the space 13 is at a substantially lower pressure. When this compacting is complete the outer tube 11 has been collapsed firmly against the particles 19 and the inner tube 12 has undergone distention so as to be positioned firmly against the particles 19. Removal of the air from the space 13 is an easy way to achieve a pressure differential between the outer environment and the space 13 sufficient to compact the particles 19 and also has increased the frictional forces between the particles 19. In this state the particles 19 closely resemble a solid mass, capable of supporting axial and radial compressive loads greatly in excess of that which the more freely flowing particles of a relaxed structure could bear. Axial tension loads may be carried by the tubes 11 and 12. When the structure has been rigidized the valve 17 is closed and operation of the pump 20 may be ceased. To again make the structure non-rigid the hose 21 is disconnected from the nozzle 14 and the valve 17 is opened allowing air from the outer environment to enter the space 13, or air may be pumped into the space 13 via the hose 21 and the nozzle 14.

Members constructed as shown in FIGS. 1 and 1a have been designed to make possible efficient particle compacting and because the space 13 is relatively narrow compared to the tube diameter, a high strength to weight ratio is achieved; i.e., the cross-sectional moment of inertia is high yet the structure is low in weight because the walls are thin. Further, by constructing members of endless cross-sectional configuration with a hollow core they may be easily folded when in a relaxed condition.

Figure 2:
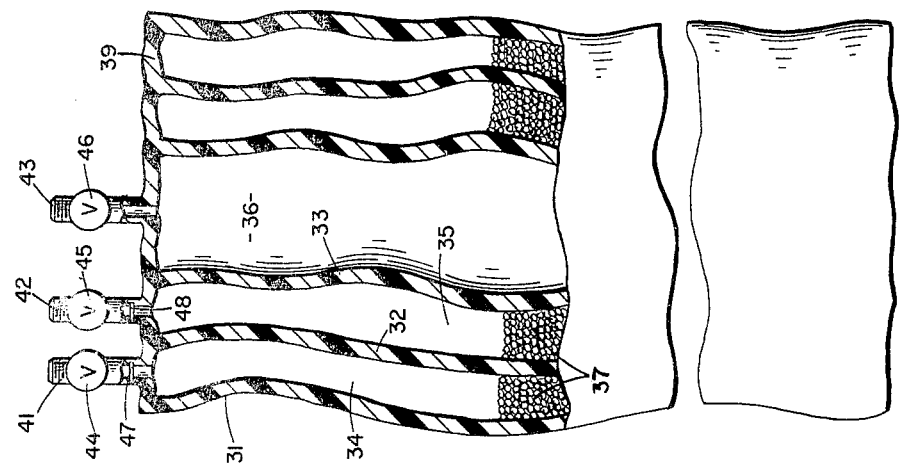
FIG. 2 shows a triple walled rigidifiable support member in a relaxed condition.

FIG. 2 shows another embodiment of this invention wherein three concentrically positioned tubes 31, 32, and 33 are separated by annular spaces 34 and 35. The radial distances between the tubes are relatively small as compared to the tube diameters. A chamber 36 is formed by the space or core within the innermost tube 33. A bulkhead 39 and a lower bulkhead, not shown, are sealed to each of the tubes 31, 32 and 33 along their entire periphery to act in conjunction with the tubes to completely enclose the spaces 34 and 35 and the chamber 36. The spaces 34 and 35 contain a fluid such as air and particles 37 which are described in detail below. Communication between the outer environment and the spaces 34 and 35 and the chamber 36 is accomplished through nozzles 41, 42, and 43 together with valves 44, 45, 46. Screens 47 and 48 are positioned within the nozzles 41 and 42, respectively, to prevent escape of the particles 37. The spaces 34 and 35 contain air, are not completely filled with particles, and experience a pressure substantially equal to that of the outer environment and of the chamber 36. The multitubular structure of FIG. 2 lacks rigidity since the particles 37 are not being subjected to a compacting force and may be folded. The relatively free flowing particles 37 are located in the lower portion of the spaces 34 and 35 and in that region are sufficient in number to force the flexible inner tube 33 into a somewhat collapsed condition and tend to bulge out the outer flexible tube 31.

FIG. 2a shows the multitubular walled structure of FIG. 2 in a rigidized condition. Here the nozzles 41 and 42 are connected to a vacuum pump 38 by suitable connecting means such as hoses 49 and 50 together with valves 54 and 55. The nozzle 43 is connected to a pressure pump 51 by suitable connecting means such as a hose 52 and a three-way valve 56. Valves 44, 45, 53 and 54 are open to allow the air in the spaces 34 and 35 to be evacuated by operation of the pump 38. The valves 46 and 56 are open so as to allow air to be pumped into the chamber 36 by operation of the pump 51. The chamber 36 is now at a pressure greater than one atmosphere. The outer environment is at one atmosphere of pressure. The spaces 34 and 35 are at a pressure substantially less than that of either the chamber 36 or the outer environment. Such a pressure gradient causes the tubes 31, 32, and 33 to converge upon the particles 37 forcing them to relocate and occupy the entire, now reduced in volume, spaces 34 and 35. Compacting will also result if the air in the spaces 34 and 35 is not evacuated but the chamber 36 is pressurized to give a substantial pressure differential between the chamber 36 and the spaces 34 and 35 thus providing the necessary compacting force. However, for a given pressure differential the structure cannot bear as much load when the fluid remains within the spaces 34 and 35 as when it has been removed. This is because compacting is retarded and friction between the particles 37 is minimized by the presence of the fluid.

When the structure is relaxed as shown in FIG. 2 the fluid within the spaces 34 and 35 may be removed without the aid of a vacuum pump by opening the valves 44, 45 and 46 and pressurizing the chamber 36 by connecting the pump 51 to the nozzle 43 via the hose 52 as shown in FIG. 2a. This will cause tube 33 to expand toward tube 32 thereby forcing the fluid in space 35 out through the nozzle 42. Continued pressurization of the chamber 36 will cause tubes 32 and 33 to move toward the tube 31 and force the fluid from the space 34 out through the nozzle 41. Not only has the fluid been expelled but the particles 37 have been compacted and the structure is rigid. Other methods of forcing the fluid out of spaces 34 and 35 include heating of the fluid within the enclosed chamber 36 so that it will expand and move the wall of tube 33 toward the wall of tube 32 thereby forcing the fluid out of the spaces 35 and 34. Heating could also be used to evaporate the fluid within the spaces 34 and 35.

Once rigidity is achieved, it is maintained by closing the valves 44, 45, and 46. A relaxed structure can again be realized by disconnecting the hoses 49, 50, and 52 from the nozzles 41, 42 and 43 and opening the valves 44, 45 and 46 to allow fluid from the outer environment to enter the spaces 34 and 35 and a portion of the fluid in the chamber 36 to enter the environment so as to equalize the pressure on all sides of the tubes 31, 32, and 33.

It is possible to eliminate the requirement for the valves 44 and 45 and still provide for removal of the fluid from the spaces 34 and 35 by constructing the tubes 31 and 32 of a semi-permeable material that will allow passage of the fluid from within the spaces 34 and 35 but will prohibit transmission of the particles 37. For example, if the fluid within the spaces 34 and 35 is air and the tubes 31 and 32 were of a semi-permeable nature, pressurization of the chamber 36 would cause the tube 33 to move toward the tube 32 and in so moving compact the particles and force the air within the space 35 through the tube 32 and into the space 34. Then both tubes 33 and 32 move toward tube 31 to compact the particles 37 and force the air from the space 34 into the outer environment. When this process is complete the structure is rigid. Depressurization of the chamber 36 would allow air from the outer environment to return to spaces 34 and 35 thereby relaxing the structure.

The embodiment of FIGS. 2 and 2a maintains the advantageous features of the member shown in FIGS. 1 and 1a and in addition possesses several further salient characteristics. For example, the structure of FIG. 2a is capable of bearing greater bending and compression loads than that of FIG. 1a due to the increased effective particle wall thickness. Of course, it would be possible to obtain a similar particle wall thickness when using the FIG. 1 structure merely by increasing the size of the space 13 and inserting more particles. However, a number of narrow spaces such as shown in FIG. 2 provide a measure of safety for in the event a rupture occurs in one of the tubes there are spaces which would not be affected by such a failure and structural rigidity would be maintained.

Increased wall thickness also results in better insulation. Use of a multitude of relatively thin spaces, rather than one thick space, allows use of different type particles in each space. This may be desirable where insulation from several different environmental conditions such as heat, sound, and radiation is necessary and a given particle material, size or shape can most efficiently insulate from one of these properties. For instance, it may be desirable to insulate the chamber 36 from radiation and the outer environment from sound. It may be that no one particle material, shape, and density will given optimum insulation from both of these. In such a case particles designed to give extremely efficient insulation from sound would occupy space 35 and particles providing optimum radiation protection would be contained within the space 34.

The structural arrangement of FIG. 2, including the chamber 36, allows alternative methods of rigidization; that is, the pressure differential necessary to compact the particles may be achieved either by pressurizing the chamber 36 or, if the outer environment is at a substantial pressure, by evacuating the fluid from the spaces 34 and 35, or by a combination of both of these methods. The fluid evacuation may be accomplished independently of (e.g. use of a vacuum pump) or may be induced by pressurization of the chamber 36 e.g. use of semi-permeable tubes).

When semi-permeable tubes are used and the fluid within the spaces 34 and 35 is forced out by pressurization of the chamber 36, the need for the vacuum pump 38 and for the nozzles 41 and 43, the valves 44 and 45, and the screens 47 and 48 is eliminated. However, unless a fluid for use within the spaces 34 and 35 is found free in the outer environment, such as air in the earth's atmosphere, the structure could not be relaxed when the chamber 36 is depressurized for there would be no fluid to enter the spaces 34 and 35 through the semi-permeable tubes 31 and 32. If such fluid is not free in the environment, as it would not be in outer space, or other vacuum environment, it is necessary in order to relax the structure to pump fluid into the spaces 34 and 35 through through the nozzles 41 and 42. This can easily be accompilshed by use of the three way valve 56 and the pressure pump 51.

The valve 54 may also be operated to allow fluid to be pumped from the chamber 36 by operation of vacuum pump 38.

When it is desired to use the member depicted in FIGS. 2 and 2a in outer space or in some other vacuum environment, the fluid within the spaces 34 and 35 may be easily evacuated by merely opening valves 44 and 45 and the fluid will vent to the outer environment.

However, since after venting the fluid, the pressure within the space 34 and 35 wil be equal to that of the outer environment, the tubes 31 and 33 will not be urged toward the tube 32 and hence compacting of the particles 37 will not occur. Therefore, it is necessary to pressurize the chamber 36 in order to accomplish compacting of the particles 37.

If the structure were transported into the vacuum environment in such a condition that air or other fluid at one atmosphere of pressure remained within the chamber 36, then pressurization of the chamber 36 after the fluid in the spaces 34 and 35 was vented would not be necessary for the one atmosphere pressure gradient between the chamber 36 and the spaces 34 and 35 would be established and particle compacting will occur. However, it may necessary to evacuate the chamber 36 prior to transporting the structure in order to fold it. If so, then pressurization of the chamber 36 would be necessary when it is desired to rigidize the structure in a vacuum environment.

FIG. 3 shows a modification of the structural member shown in FIG. 2. The spaces 34 and 35 have been compartmentalized by a plurality of strips 61 and 62 which extend longitudinally from the bulkhead 39 to the lower bulkhead forming a series of longitudinally extending compartments 63 between tubes 31 and 32 and a series of similar compartments 64 between tubes 32 and 33. The strips 61 extend radially from the inner surface of the tube 31 to the outer surface of the tube 32. The strips 62 extend radially from the inner surface of the tube 32 to the outer surface of the tube 33. Communication between the compartments 63 and 64 and the outer environment is accomplished by a series of nozzles 65 and 66 which extend from each of the compartments to the outer environment. Such communication is controlled by a series of valves 67 and 68. A series of screens 69 and 70 are located within the nozzles 65 and 66 respectively to prevent particle escape.

A nozzle, valve, and screen is required for each compartment. They provide a means to remove fluid from or add it to each of the compartments 63 and 64. They may be eliminated and removal of fluid from and addition of fluid to the compartments 63 and 64 still accomplished if the structure is used in an environment wherein a fluid suitable for use within the compartments 63 and 64 is found free and the tubes 31 and 32 are constructed of a semi-permeable material. If such is the case then pressurization or depressurization of the chamber 36 causes distention or contraction of the impermeable tube 33 which acts upon the environmental fluid to drive it out of or induce it into the spaces 34 and 35 making the structure rigid or relaxed.

The strips 61 and 62 aid in control of particle shifting and provide a high measure of safety in the event a leak develops at some point in the tubes 31, 32, or 33. For example, if the structure is used in the earth's atmosphere and the strips 61 and 62 are not used and a puncture develops in the semi-permeable tube 31 large enough to allow the particles 37 to escape, or if a leak develops in the impermeable tube 33 allowing fluid within the chamber 36 to exit into the space between tubes 33 and 32 and also into the space between tubes 32 and 31 (the latter would occur if the tube 32 is semi-permeable) structural failure will occur. The strips 61 and 62 serve to confine the adverse effects of such tube punctures to a small portion of the structure. In most cases this would be sufficient to prevent structural failure. If the tubes 31 and 32 are of a semi-permeable material then the strips 61 and 62 in order to confine the effects of a puncture to one of the compartments 63 or 64 are of an impermeable material and the strips 61 are positioned in radial alignment with the strips 62. Or if all of the tubes 31, 32, and 33 are of an impermeable material and the structure is used on earth then a puncture occurring in any of the tubes would destroy the vacuum condition existing within the spaces between the tubes. Here also the use of the impermeable strips 61 and 62 will prevent total structure collapse.

The multitubular member shown in FIG. 3 is shown in relaxed condition. It may be rigidized and relaxed in a manner similar to that described in conjunction with FIG. 2a. It will be understood that the illustrated vacuum pump will be suitably connected to each of the nozzles of compartments to be evacuated.

FIG. 4 shows a double tubular walled structure in unrigidized condition, in which an outer tube 101 is spaced from an inner tube 102. Between the tubes 101 and 102 are a series of smaller tubes 104. The space within the tube 102 comprises a chamber 105. The spaces within the smaller tubes 104 are designated as chamber 117. Movement of any of the smaller tubes 104 is restrained by four longitudinal strips 106 extending from each of the tubes 104, two to the tube 102 and two to the tube 101. The strips 106 also serve to subdivide the space between the tubes 101 and 102 into compartments 107. Contained with the compartments 107 are a multiplicity of particles 108 and a fluid such as air. Top and bottom bulkheads of which only that designated at 109 is shown serve to cooperate with the tubes 101 and 102 and the strips 106 to seal the compartments 107 and the chambers 105, 117. Communication between the chamber 105 and the outer environment is via a nozzle 111 and is controlled by a valve 112. Communication between the compartments 107 and the outer environment is maintained through nozzles 114 and controlled by the valves 115. Screens 116 located within the nozzles 114 prevent escape of the particles 108. Communication between the chambers 117 and the outer environment is maintained via the nozzles 118 and controlled by valves 119.

The tubes 101, 102, 104, the bulkheads 109 and 110, and the strips 106 may be constructed of a suitable thin, flexible material as described herein. The tube 101 may be of a semi-permeable nature, allowing passage of the fluid but not of the particles 108. If such is the case, then the nozzles 114 are not needed when the fluid within the space 103 is found free in the environment. If it is not so found, then nozzles 114, valves 115 and screens 116 will be necessary if fluid evacuation is desired. It will be understood that nozzles, valves and suitable pump connections are provided for each compartment and chamber.

The pressure within the compartments 107, the chambers 117, the chamber 105, and the outer environment is the same. There is fluid within the compartments 107. Therefore the structure is in a relaxed condition and the particles 108 are settled in the lower portion of each of the compartments 107 and are sufficient in number to force the flexible inner wall of the tube 102 into a somewhat collapsed condition and tends to force the outer flexible wall of the tube 101 in an outward direction.

When the chamber 105 and the chambers 117 are pressurized by a pressure pump 120 which is connected to the nozzles 111 and 118 by a three way valve 124 and suitable connecting means such as hose 121, the particles 108 are compacted and also the fluid within the compartments 107 is forced out due to the distension of the tubes 102 and 104, either through the nozzles 114 or through the tube 101 if the latter is of a semi-permeable nature. The fluid within compartments 107 may also be drawn out through the nozzles 114 by use of a vacuum pump connected through a valve 122 to the compartments and chambers. When compacting is completed the structure becomes rigid. It may be relaxed by depressurizing the chambers 105 and 117 and/or by admitting fluid into the compartments 107. During pressurization of chamber 105 and the chambers 117 the valve 122 is closed. During evacuation of fluid from the compartments 107 the valve 122 is open and the three way valve 124 and the valve 119 are closed.

The number of particles 108 within the compartments 107 and the relative diameters of the tubes 101 and 102 are such that collapsing of tube 101 and distention of tube 102 will firmly compact the particles 108 with a minimum pressure gradient. The member shown in FIG. 4 provides for extremely exacting control over structure rigidification, efficient compacting of the particles 108, and a high measure of safety in the event a puncture occurs in one of the tubes.

FIG. 5 shows a structural member in a rigid condition comprising two concentric spheres 210 and 211. The space between the spheres 210 and 211 contains a multitude of particles 213.

A reversible pump 221, in conjunction with a hose 222, valve 217 and nozzle 216 provides a means for pressurizing or depressurizing the interior of the sphere 211. A reversible pump 214, in conjunction with a hose 215, valve 219 and nozzle 218 provides a means for evacuating the fluid from or supplying fluid to the space between the spheres 210 and 211. Valves 217 and 219 serve to allow or prevent fluid flow through the hoses 222 and 215 respectively. A screen 220 within the nozzle 218 prevents escape of the particles 213.

Rigidity is achieved by pressurizing the interior of the sphere 211 and is aided by evacuation of the fluid from between the spheres 210 and 211. Pump 221 is operated so as to pump air from the atmosphere into the interior of the sphere 211. The pump 214 is operated so as to evacuate the fluid surrounding the particles 213. When the structure is rigid the valves 217 and 219 are closed. To relax the structure the valves 217 and 219 are opened and the pumping direction of the pumps 214 and 221 are reversed. The fluid is withdrawn from the interior of the sphere 211 and fluid is injected into the space between the spheres 210 and 211. Hemispheres or other partial spheres may also be used in a similar manner. Other structural shapes such as rectangles or cubes may also be utilized.

It has been found that NaCl particles of a size from 25 to 100 microns, glass beads of at least 50 microns, phenolic microballoons or urea-formaldehyde hollow spheres from 1 to 100 micron diameter perform satisfactorily in a rigidized load bearing structural members of the several illustrated embodiments. The particular choice of particle material will depend somewhat on the function it is to serve which in turn is governed by the use to which a given rigidized structural apparatus will be put. For example, if transfer of thermal energy is to be retarded the particles themselves may be of a low thermal conductivity material. Structure weight may be critical and use of a particle material with a high strength to weight ratio may be advisable. The type of loading may also influence the choice of particle size, shape and material.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. A rigidizable load bearing structural member comprising:
    a thin flexible gas impermeable membrane forming a body, the volumetric space within said impermeable membrane comprising a pressurizable chamber;
    a thin flexible gas permeable membrane spaced apart from said impermeable membrane on the outside thereof and substantially concentric therewith, said permeable membrane and said impermeable membrane defining a space therebetween, the space between said membranes being substantially less than the breadth of the chamber within said impermeable membrane;
    a multiplicity of free flowing particles within said space;
    a gas within said chamber; and
    means for pressurizing the gas in said chamber whereby said impermeable membrane acts upon said particles for causing compaction thereof and expulsion of excess gas from the space through said permeable membrane.

2. A rigidizable load bearing columnar structural member comprising:
    a multiplicity of thin flexible concentric tubes spaced a distance apart and defining a plurality of concentric spaces between said tubes;
    the spaces between said tubes being substantially less than the diameter of the innermost of said tubes;
    a multiplicity of free flowing particles within the spaces;
    a gas within the spaces;
    the volumetric space within the innermost of said tubes comprising a chamber;
    top and bottom bulkheads of a diameter equal to that of the outermost of said tubes attached along the entire peripheral edges of each of said tubes to seal the spaces and the chamber from the outer environment;
    a gas within the chamber; and
    means including a valve for inducing pressure in the chamber;
    said bulkheads and all of said tubes other than the innermost one being constructed of a material permeable to said gas but impermeable to said particles whereby gas is transmitted into and out of said spaces occurs through said permeable material and is regulated by the pressure induced upon said chamber by the gas therein.

3. An elongated load bearing column comprising:
    a plurality of mutually spaced primary concentric tubes, the volumetric space within the innermost of said tubes comprising a chamber all of said primary tubes other than the innermost being gas permeable,
a plurality of secondary tubes of a diameter smaller than that of the innermost of said primary tubes located within the space between two of said primary tubes, the volumetric spaces within each of said secondary tubes comprising second chambers,
top and bottom bulkheads of a diameter equal to that of the outermost of said primary tubes attached to each of said primary and secondary tubes so as to seal said spaces and said chambers from the outer environment,
a plurality of thin flexible longitudinal gas-permeable, strips extending longitudinally from one of said bulkheads to the other of said bulkheads and extending radially from each of said secondary tubes to one of said primary tubes to divide the spaces between the primary tubes into a number of compartments,
a multiplicity of free-flowing hollow particles contained within said compartments, and
means for transmitting gas into and out of said compartments and said chambers.

References Cited by the Examiner

UNITED STATES PATENTS

| | | | |
|---|---|---|---|
| 468,455 | 2/1892 | Giessmann | 135—1 |
| 2,197,568 | 4/1940 | Donnell | 244—125 |
| 2,649,101 | 8/1953 | Suits | 52—262 |
| 2,764,950 | 10/1956 | Finnell | 206 |
| 2,999,366 | 10/1961 | La Fave | 52—404 |

FRANK L. ABBOTT, *Primary Examiner.*

J. NACKENOFF, *Examiner.*

J. E. MURTAGH, *Assistant Examiner.*